Feb. 25, 1930. J. H. STOTT 1,748,528
LAMINATED SPRING
Filed March 5, 1926 2 Sheets-Sheet 1

Inventor
John Henry Stott

Feb. 25, 1930. J. H. STOTT 1,748,528
LAMINATED SPRING
Filed March 5, 1926 2 Sheets-Sheet 2

Inventor
John Henry Stott
By W. Singer, Atty.

Patented Feb. 25, 1930

1,748,528

UNITED STATES PATENT OFFICE

JOHN HENRY STOTT, OF GLEN MAY, DERBY COUNTY, ENGLAND

LAMINATED SPRING

Application filed March 5, 1926, Serial No. 92,590, and in Great Britain, August 17, 1925.

This invention relates to suspension mechanism for road vehicles wherein laminated springs are employed. The invention has particular reference to clips or straps which are placed around the spring intermediately of its ends or portions which are attached or associated with the chassis and with the axle.

Clips or metal straps are at present commonly provided intermediately of the attached portions of the spring for preventing the plates of the spring from becoming displaced laterally one with respect to another. Such clips have also been adapted for causing one or more of the reinforcing plates to be deflected together with the main plate both on normal deflections and on reverse or rebound deflections.

The primary object of the present invention is to provide a clip which is adapted to be positioned on the spring intermediately of the attached portions and is constructed so that pressure can be applied to the plates of the spring enclosed within the clamp so as to increase to any desired extent the frictional resistance to the longitudinal sliding motion which takes place between the leaves of the spring as the spring is deflected. By this means it will be seen that a clip, which also serves to prevent lateral displacement of the plates of the spring and to cause the reinforcing plates to operate for both normal and rebound deflections of the spring, is caused to damp the deflection of the spring and thereby prevent undesirable high frequency oscillation and too vigorous a rebound action.

Further objects of the present invention are to provide a clip of such a deflective construction that it will cause the pressure applied to the plates of the spring to be distributed over a considerable area or distance longitudinally of the spring, and thus avoid any tendency for the clip to tilt and become jammed by the relative sliding movement of the plates, and so become subjected to undue stresses, or cause the action of the spring to be limited to an undesirable extent.

A further feature of the present invention is to provide a construction of clip which will effectively reinforce the bolts used as securing members and prevent them from becoming bent or distorted by the deflections of the spring.

Referring to the drawings:—

Figure 1:
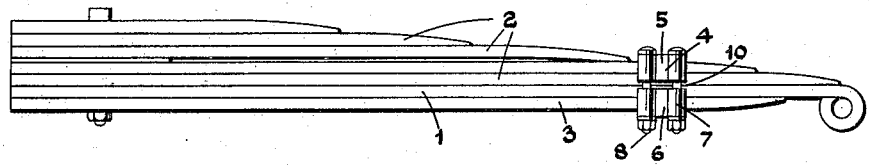
Figure 1 is a view in side elevation showing my invention applied to a quarter elliptic spring having the features set out in my prior British specification No. 10,861 of 1925.
Figure 2:
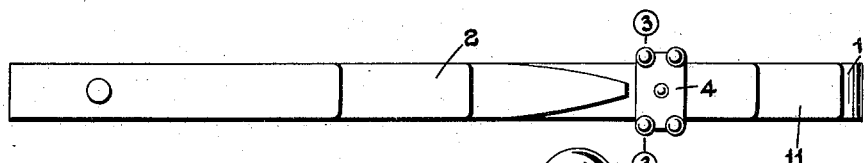
Figure 2 is a plan view.
Figure 3:
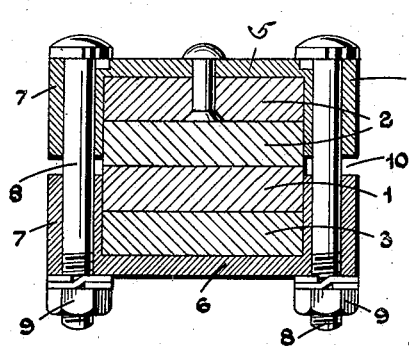
Figure 3 is a cross section on line 3—3 of Figure 2.

In the construction illustrated in Figures 1 to 4, the semi-elliptic spring is provided with a master plate 1 and with working plates 2 in addition to which a plate 3 is placed upon the opposite side of the master plate, which plate 3 operates both as a working plate and a rebound plate.

The clip, designated as a whole, 4 is provided for the purpose of preventing the plate 3 from separating from the plate 1 when the spring is stressed and also for the purpose of applying the necessary pressure between all the plates enclosed by the clip so as to increase the friction between them in order to obtain any desired damping effect and to minimize rebound.

The clip illustrated in Figures 1 to 4 comprises two U shaped clamping plates 5 and 6, one of these clips, say 5, being attached or otherwise located upon the plate 3 or to one of the plates 2 by riveting or other suitable means.

It is to be understood that in some cases the clip will be sufficiently well located on the spring by reason of the clamping action of the clip, the surfaces of the clamping members which contact with the plates of the spring being roughened if desired.

Figure 11:
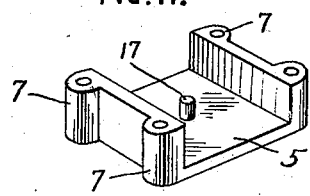
Figure 11 is a perspective view which shows a modified construction for one-half of the clip.

In the modification shown in Figure 11, one half of the clip is provided with a projection or pin 17 for the purpose of engaging in a hole or depression to be drilled or formed in one of the spring plates and the pin or projection is adapted to locate the clip upon the spring to prevent bodily motion of the clip longitudinally of the spring. Such hole or depression is preferably made in a working plate or a rebound plate but not in the master plate.

Both the plates 5 and 6 are provided with tubular bosses 7 at the sides of the spring for receiving the securing bolts or studs 8.

The bosses 7 support the studs 8 against bending or tilting.

The clip is provided with two securing members 8 upon each side of the spring and the bolts of each pair are spaced apart along the length of the spring so that the clip as a whole is provided with a relatively long base both at the top and at the bottom in order to avoid any tendency of the clip to tilt on the spring and cause jamming of the spring plates.

It will be observed that when the clip is mounted on the spring and the nuts 9 are tightened on the bolts 8, gaps 10 remain between the two plates 5 and 6 so that any desired degree of pressure can be obtained upon the plates of the spring.

Figure 5:
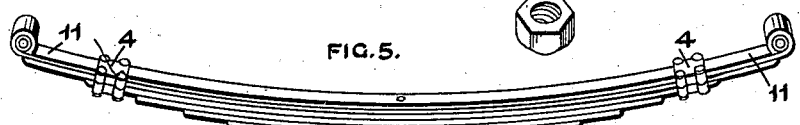
Figure 5 is a perspective view showing my invention applied to a semi-elliptic spring.

Figure 5 shows the application of a similar clip to a semi-elliptic spring, it being observed that there is a portion 11 at each end of the spring which is relatively free from the influence of the clips, these portions permitting the spring to absorb the relatively small and rapid vibrations as caused by small paving sets with uneven road surfaces, while larger deflections in either direction from large pot holes or other obstructions are borne by the whole spring and appreciably damped.

Figure 6:
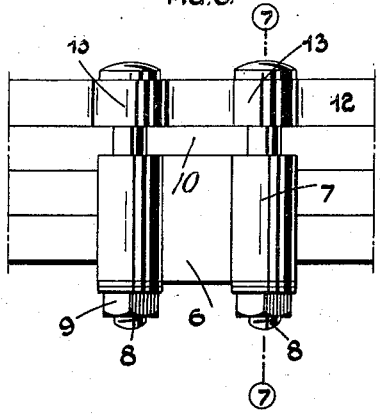
Figure 6 is a view showing another form of clip constructed in accordance with my invention.
Figure 7:
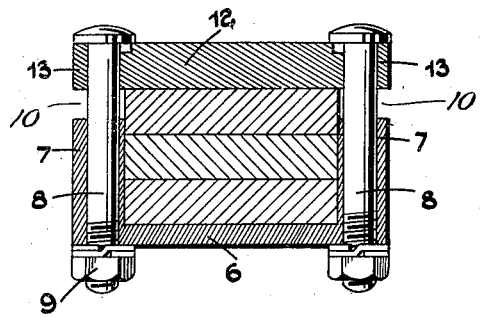
Figure 7 is a transverse section on line 7—7 of Figure 6.
Figure 8:
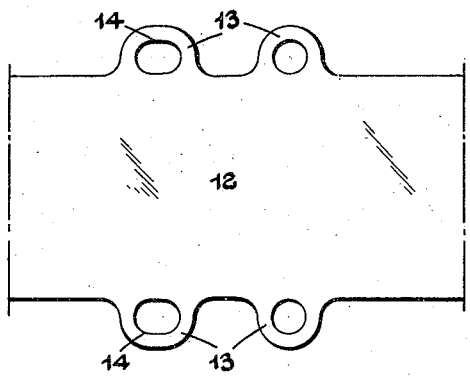
Figure 8 is a plan corresponding with Figure 6.

In the construction shown in Figures 6, 7 and 8, the plate 5 is dispensed with and the upper plate 12 of the spring is formed with integral laterally projecting lugs or clamping portions 13 which receive the clamping bolts 8.

In this arrangement the clip is located on the spring by the engagement of the bolts 8 in the lugs 13, the U-shaped plate 6 not being positively secured to the spring so that the spring plates are free to slide relatively to each other. Two of the holes 14 in the lugs 13 may be elongated as shown so that when the spring bends, those portions of the spring plates which are between the two pairs of bolts are able to bend without jamming.

When the nuts are tightened on the bolts 8, a relatively small gap 10 remains between the clip 6 and the lugs 13 (from one thirty second to one eighth of an inch is recommended).

Figure 4:
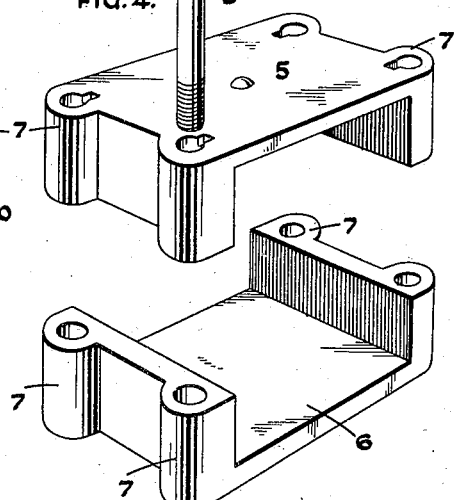
Figure 4 is a perspective view of the parts of the clip shown in Figures 1, 2 and 3.
Figure 9:
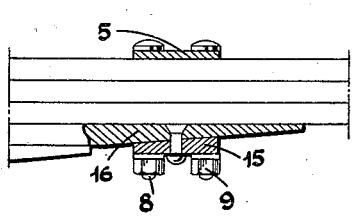
Figure 9 is a view in side elevation partly in section showing one of my improved clips applied to a spring where the ends of the working plates are tapered.
Figure 10:
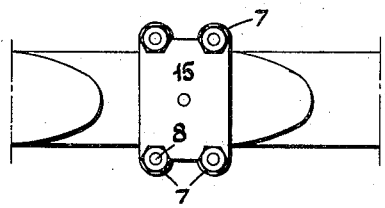
Figure 10 is a plan view thereof.

In the construction shown in Figures 9 and 10 the clip comprises an upper plate 5 which is similar to the plate 5 described with reference to Figure 4. This plate 5 is used with a lower plate 15 the base of which is tapered as shown, the plate 15 being positively secured to the working plate 16 of the spring. In this construction the plates have tapered tips so that the clamping plate of the spring engaging with said tapering parts must be positively prevented from sliding thereon otherwise jamming will occur. The construction is otherwise similar to that described with reference to Figures 1 to 4.

What I claim then is:—

1. A damping clip adapted to be disposed on a spring consisting of a plurality of superposed separate plates between the points of attachment of such spring, said clip comprising an inverted U-shaped clamping member placed saddlewise upon one side of the spring and rigidly attached to one of the plates of the spring, a second U shaped clamping member placed saddlewise upon the opposite side of the spring, a pair of tubular bosses on each of the arms of the said two clamping members, the bosses constituting each pair being spaced apart longitudinally of the spring, and securing bolts engaging the bosses and serving to clamp the clamping members on the spring, said bolts being surrounded by the bosses for the greater part of their length, whereby pressure can be applied to the spring for a substantial portion of its length and the plates of the spring can slide longitudinally one upon the other within the clip without danger of the clip tilting and jamming the said plates.

2. A damping clip for springs of the kind comprising a plurality of superposed separate plates, the clip comprising two parts, a locating projection on one of said parts adapted to engage in a hole formed in one of the spring plates, the other part of the clip being adapted to embrace other plates of the said spring, bolts passing through holes in the said parts and serving to clamp the said parts on the spring, means being provided for preventing said bolts rotating in the said parts, the clip serving to increase friction between the plates of the spring and thereby functioning for the latter, and the clip being of such a length as to eliminate rocking movement thereof and consequent jamming with the leaves of the spring.

In witness whereof I affix my signature.

JOHN HENRY STOTT.